Feb. 13, 1968         A. T. BUTTRISS         3,368,780
FASTENER DEVICE AND MOUNTING ASSEMBLY
Original Filed Aug. 31, 1964
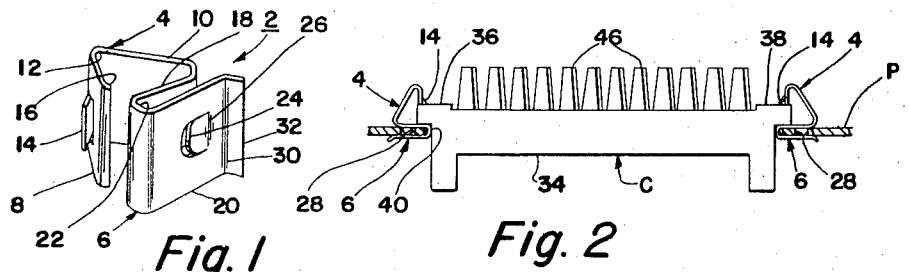
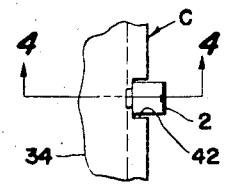
Fig. 3
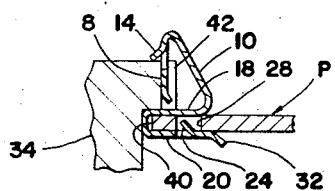
Fig. 4
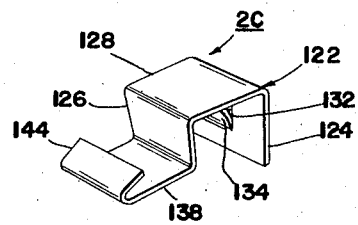
Fig. 5
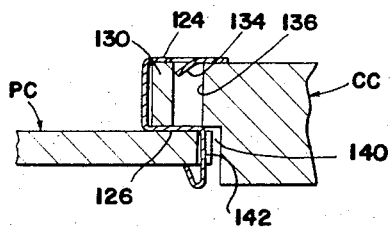
Fig. 6
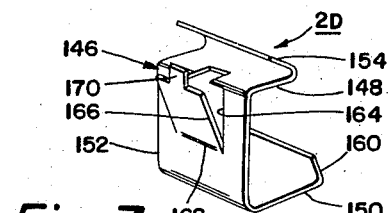
Fig. 7
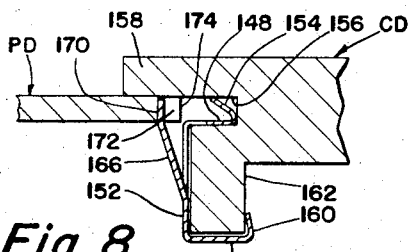
Fig. 8
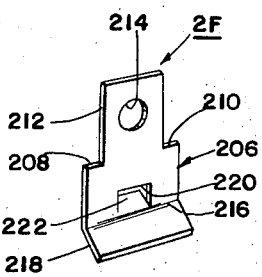
Fig. 9
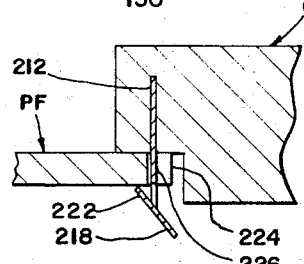
Fig. 10
INVENTOR.
ALBERT T. BUTTRISS
BY
Teare, Teare & Sammon
ATTORNEYS United States Patent Office 3,368,780
Patented Feb. 13, 1968

3,368,780
FASTENER DEVICE AND MOUNTING ASSEMBLY
Albert T. Buttriss, Westlake, Ohio, assignor to Tinnerman Products, Inc., a corporation of Ohio
Original application Aug. 31, 1964, Ser. No. 393,170, now Patent No. 3,279,729, dated Oct. 18, 1966. Divided and this application Feb. 28, 1966, Ser. No. 530,722
15 Claims. (Cl. 248—27)

This invention relates in general to fastening means and more particularly to fastener devices and an assembly for retaining objects, such as electrical connectors, in mounted relation on a workpiece.

This application is a division of the co-pending application to Albert T. Buttriss, Serial No. 393,170 filed August 31, 1964, now U.S. Patent 3,279,729 granted October 18, 1966.

Conventionally, various types of electrical connectors have been mounted on panels, modules or circuit board racks, such as applied in electronic installations, for connection to a source of electrical power. Heretofore, various fastening devices and/or assemblies, such as screw or rivet arrangements, have been proposed for mounting such connectors on the panels. In this respect, it has been found that these heretofore known devices are not satisfactory due to their expense of manufacture and the difficulty incident to their assembly and disassembly, particularly in relation to the installation of a great number of connectors in blind locations which are not readily accessible at the rear of the panel to complete the installation. In has further been found that these heretofore known devices do not afford an exact alignment between the parts, particularly when there exists substantial tolerance variation between the parts; nor do they prevent lateral shifting movement of the connectors, particularly where adjacent of the connectors are either missing or removed from installed position on the panel.

Accordingly, an object of the present invention is to provide a simple, yet sufficient fastener device construction which is inexpensive to produce for mounting an electrical element, such as a connector to a workpiece.

Another object of the present invention is to provide a sheet metal fastener device of the character described which can be readily and easily assembled and disassembled for mounting an electrical connector on a supporting member, such as a panel, modules, circuit rack or the like, thereby dispensing with the necessity of heretofore known screw and rivet arrangements.

A further object of the present invention is to provide an improved assembly including an electrical connector to be mounted on a workpiece, such as a panel, modules, circuit rack or the like, and a fastener device for retaining the connector in mounted position on the workpiece and in a manner to prevent lateral shifting movement of the connector irrespective of tolerance variations between the parts.

Further objects and advantages of the present invention will be apparent to those skilled in the art as the description herein proceeds in reference to the accompanying drawings in which like reference characters designated like parts throughout and in which:

FIG. 1 is an enlarged generally perspective view of the fastener device made in accordance with the present invention;

FIG. 2 is a fragmentary elevational view partly in section and showing a pair of the fastener devices of FIG. 1 in assembled position for mounting an article, such as an electrical connector, on an apertured support member;

FIG. 3 is an enlarged fragmentary top plan view showing the fastener in assembled position within the notched portion of one of the flanged ends of the connector;

FIG. 4 is a longitudinal cross-sectional view taken along the plane indicated by the line 4—4 of FIG. 3;

FIG. 5 is an enlarged perspective view of a modification of the fastener device made in accordance with the present invention;

FIG. 6 is a fragmentary cross-sectional view showing one end of an article, such as an electrical connector, mounted through an opening in a support member by one of the fastener devices shown in FIG. 5;

FIG. 7 is an enlarged generally perspective view of a further modification of the fastener device made in accordance with the present invention;

FIG. 8 is a fragmentary cross-sectional view showing one end of an article, such as an electrical connector, mounted in an opening in a support member by one of the fastener devices shown in FIG. 7;

FIG. 9 is an enlarged generally perspective view of still a further modification of the fastener device made in accordance with the present invention; and FIG. 10 is a fragmentary cross-sectional view showing one end of an article, such as an electrical connector, mounted in an opening in a support member by one of the fastener devices of FIG. 9.

Referring now again to the drawings and in particular to FIGS. 1 to 4 thereof, there is shown one embodiment of the fastener device, designated generally at 2, for mounting an electrical connector C on an aperture support panel P, such as might be utilized in an electronic installation. The fastener 2 is of a relatively simple, inexpensive construction susceptible for economical quantity production from standard sheet metal strip with minimal waste of material. The fastening 2 may be made from any suitable sheet material preferably that of a spring-like nature, such as spring steel or cold rolled steel having spring-like characteristics. As best shown in FIG. 1, a generally triangularly shaped arm portion 4 is provided for attachment to the connector C or to any other desired article, and a generally U-shaped clip portion 6 is provided for attachment to the panel P. The connector attachment portion 4 is defined by and includes a pair of inner 8 and outer 10 resilient legs joined together by a curved apex section 12. As shown, the legs 8 and 10 diverge from one another from the apex of the triangular configuration defined and in the general direction of the U-shaped portion 6. In the embodiment shown, the inner leg 8 preferably includes a resilient tongue 14 struck from the material of the leg. The tongue 14 projects angularly outwardly and downwardly from the general plane of the leg 8 for coacting overlying engagement against the top or upper surface of a flanged end of the connector C to prevent shifting movement of the connector in a general vertical direction, as best shown in FIGS. 2 and 4. The leg 8 also includes an angularly inwardly bent cam-like flange 16 which is laterally spaced from the U-shaped portion 6 to facilitate application of the fastener to the connector.

The U-shaped clip portion 6 includes and is defined by another resilient leg 18 which extends inwardly from the free end of the outer leg 10 and a leg 20 which extends outwardly from a curved bight section 22 joining the legs 18 and 20 together to provide the U-shaped configuration shown. The legs 18 and 20 converge angularly towards one another from the curved section 22 toward the open end thereof to provide a yieldable clip-like arrangement which is readily adapted to engage various thickness of flanged end portions of the panel P, as hereinafter more fully described.

In the embodiment shown, the U-shaped clip portion 6 further includes a resilient tab 24 struck from the leg 20 along the bend line 26. Preferably, the tab 24 projects angularly upwardly from the general plane of the leg 20 in the general direction of the section 22 so that when the U-shaped clip portion 6 of the fastener is applied to the panel P, the tab 24 snaps into coacting engagement within an aperture 28 (FIG. 4) provided in the panel to prevent any movement of the fastener relative to the panel. Moreover, such tab arrangement permanently locks the fastener to the panel and effectively prevents any inadvertent shifting movement of the fastener relative to the panel. To facilitate application of the U-shaped clip portion 6 to the panel, the free end of the leg 20 may be bent downwardly and outwardly along the bend line 30 to provide a cam-like flange 32 which extends beyond the extension of the leg 18.

As illustrated in FIG. 2 the connector C includes a body 34 made preferably from an electrical insulating material, such as a ceramic or polymeric material or other such material having electrical insulating characteristics. The body 34 in the embodiment shown is provided with a pair of flanged ends 36 and 38 extending laterally outwardly from opposite ends of the body and which are adapted to overlie the marginal portions of an opening 40 provided in the panel P. In order to prevent lateral shifting movement of the connector C relative to the panel P, the flanged ends 36 and 38 may be notched out, as shown at 42 of FIG. 3, to readily accommodate therein the inner legs 8 of a pair of fastening devices which are adapted to be assembled at opposite sides of an opening 40 in the panel P, thereby to engageably retain the flanged ends 36 and 38 of the connector C in assembled position on the panel. The connector C may be provided with suitable male electrical connection elements 46 for connection to a source of power (not shown). Moreover, by use of a pair of the fastener devices 2 constructed in accordance with the present invention, any number, size, and/or shape of connector may be readily applied to any size, and/or shape of apertured support panel dependent upon the desired application, such as may be utilized in an electronic installation.

In a typical application of the embodiment illustrated, the assembly may be achieved simply by securing a pair of the fastening devices 2 to the marginal portions of the opening 40 in the panel P so that the connector C can be inserted through the opening 40 and held in resilient snap-fastening engagement by the fasteners. More particularly, as the connector C is inserted through the opening 40, the flanged ends 36 and 38 thereof cam against and over the resilient tongues 14 of the respective fasteners to progressively force the inner legs 8 inwardly in the general direction of the outer legs 10 until they are disposed in a generally parallel relationship with the confronting outer side surfaces of the respective flanged ends 36 and 38. Such movement is continued until the tongues 14 snap back and into overlying relationship against the top or upper surface of the flanged ends 36 and 38, whereupon, the flanged ends are locked against vertical movement between the resilient tongues 14 and the legs 18 of the U-shaped portions 6 of the fasteners. Moreover, in the assembled position, the inner legs 8 are snugly seated under tension within the notches 42 of the flanged ends 36 and 38 to prevent any lateral shifting movement of the connector C relative to the fasteners. Hence, it can be seen that the U-shaped clip portions 6 and the tabs 24 provide a cooperative effect to prevent movement of the fastener in any direction relative to the panel P; while the legs 8 and tongues 14 of the triangular arm portion 4 combine to prevent any movement of the connector C relative to the fastener, thereby to prevent any movement of the connector relative to the panel in the assembled position of the fastener.

In FIGS. 5 and 6 there is illustrated another embodiment of the fastener device, designated generally at 2C which is generally similar in application to that shown in FIGS. 1 to 4. In this form, however, the U-shaped portion 122 for engagement with the connector CC includes a pair of resilient legs 124 and 126 which are integral with and extend outwardly from a generally planar bight section 128. The legs 124 and 126, in the untensioned position of the fastener, converge at a slight angle toward one another in a direction away from the section 128 so as provide an effective resilient gripping engagement with a flanged end 130 (FIG. 6) of the connector in the final assembled position of the fastener. The upper leg 124 projects outwardly beyond the outward extension of the lower leg 126 and is cut-out, as at 132 to provide a resilient tab 134. The tab 134 projects outwardly and angularly inwardly from the general plane of the leg 124 in the general direction of the section 128 for engagement within a generally vertical hole 136 provided in the flanged end 130 of the connector to prevent movement, and particularly lateral shifting movement of the connector relative to the fastener, as aforesaid.

In this form, a generally planar spring arm 138 projects downwardly and generally at right angles from the lower leg 126 for engagement with a panel PC immediately adjacent an opening 140 provided in the panel. The arm 138 is preferably of a transverse dimension so as to be snugly seated within a generally polygonal shaped notched portion 142 provided in the marginal edge of the panel adjacent the panel opening 140. The arm 138 is provided adjacent its free end with a reverse bent flange portion 144 which extends angularly outwardly and upwardly from the general plane of the arm 138 in the general direction of the lower leg 126 for engagement with the bottom or confronting undersurface of the panel to lock the fastener in assembled position with the panel. Moreover, by such arrangement, any movement, and particularly any lateral shifting movement of the fastener relative to the panel is prevented.

In FIGS. 7 and 8 there is illustrated another embodiment of the fastener, designated generally at 2D, for mounting another type of electrical connector CD to a support panel PD. In this form, the fastener 2D is formed so as to provide a generally U-shaped connector engaging portion 146 which includes and is defined by an upper 148 and lower 150 resilient legs which project outwardly and at generally right angles from a generally planar bight section 152. The upper leg 148 is reversely bent upwardly and angularly inwardly adjacent its free end to provide a resilient flange 154 defining a shoulder for engagement within a polygonal shape slot 156 defining a flanged end 158 of the connector. The lower leg 150 is bent upwardly and angularly inwardly adjacent its free end to provide another shoulder defining flange 160 for engagement against an inner surface of an integral leg 162 extending downwardly from the body of the connector. By such an arrangement, it can be seen that the shoulder defining flanges 154 and 160 of the U-shaped portion 146 effectively combine to prevent movement, and particularly lateral shifting movement of the connector relative to the fastener.

To effect securement of the fastener 2D to the panel PD, the material of the bight section 152 and the upper leg 148 of the U-shaped portion 146 is preferably struck-out, as at 164, to provide a resilient spring-arm 166. The arm 166 is preferably bent outwardly along the bend line 168 and extends angularly upwardly from the general plane of the base 152. As shown, the arm 166 includes a polygonal shaped tongue 170 having a substantially reduced transverse dimension compared to the transverse dimension of the arm 166 so as to be snugly disposed in a corresponding notched portion 172 (FIG. 8) provided in the panel immediately adjacent an opening 174 in the panel. Moreover, in the assembled position, the arm 166 and tongue 170 effectively combine to prevent movement, and particularly any lateral shifting movement of the fastener relative to the panel, and hence, any movement of the connector relative to the panel, as aforesaid.

In FIGS. 9 and 10 there is illustrated another embodiment of the fastener device, designated generally at 2F, which is particularly useful in mounting an electrical connector CF to a support panel PF, but wherein the fastener has been provided as a composite, unitary part of the connector. In this form, the strip is provided so as to define a generally flat or planar base 206 which is struck-out adjacent one end and on either side thereof, as at 208 and 210, to provide a portion 212 of reduced transverse dimension relative to the transverse dimension of the main body of the base. Such reduced portion is adapted to be fixedly embedded in the material of the connector (FIG. 10). This reduced portion 212 is preferably provided adjacent its free end with an aperture 214 so that when such portion is embedded in the material of the connector there is achieved a positive anchoring construction to prevent any movement of the fastener relative to the connector.

The other end of the base 206 is bent along the bend line 216 to provide a flange 218 which extends downwardly and angularly outwardly from the general plane of the base 206. The base 206 is struck-out immediately adjacent the bend line 216, as at 220, to provide a resilient tongue 222 which projects outwardly and angularly upwardly from the opposite side of the base and in the same general plane as the flange 218 for engagement with the bottom or undersurface of the panel adjacent the panel opening 224. Here again, the panel may be notched-out, as at 226, immediately adjacent the opening 224 to snugly receive therein the base 206 of the fastener, as shown in FIG. 10.

Hence, in application of this form of the invention, a pair of the fastening devices 2F may be readily pre-assembled with the connector CF simply by embedding the reduced portions 212 thereof in the material of the flanged ends 226 of the connector, such as by conventional molding techniques, thereby to provide a composite, unitary structure. Thus assembled, the connector CF may then be inserted into the opening 224 in the panel PF so that the fasteners are disposed through the notched portions 226 immediately adjacent the panel opening 224. In this assembled position, the resilient tongues 222 are disposed in locking engagement against the confronting bottom or undersurface of the panel immediately adjacent the panel opening 224, thereby to effectively prevent any movement of the fastener relative to the panel, and hence, to prevent any movement of the connector relative to the panel in the final assembled position thereof.

From the foregoing description and accompanying drawings of the embodiments of the fastener device made in accordance with the present invention, it can be seen that an article or object, such as an electrical connector, can readily and easily be applied to a support member, such as a panel, and in a manner to effectively prevent any movement of the connector relative to the panel in the assembled position. It can be seen further that such assembly can be accomplished regardless of any tolerance variations between the parts and regardless of any size, shape or thickness variations of connector and/or panel. Hence, though the fastener device and assembly illustrated herein have been illustrated in connection with the mounting of an electrical element, such as a connector, to a supporting panel, it is to be understood that the fastener device and assembly contemplated herein can also be satisfactorily utilized for mounting other articles or objects, such as moldings, trim strips, inspection plates, covers and the like, to other types of supporting members, such as chassis, frames, or other similar such type of supporting panel.

Thus, while I have illustrated herein a preferred embodiment of my invention, it is to be understood that changes and variations may be made by those skilled in the art without departing from the spirit and scope of the appended claims.

I claim:

1. A fastening device for connecting a pair of members in assembled relationship, said device comprising a pair of spaced, resilient legs extending from a bight portion connecting said legs together and adapted for receiving therebetween a portion of one of said members, one of said legs including a retainer means for engageable coaction with one of said members, and attachment means extending from the free end of one of said legs for attachment of the device to the other of said members, said attachment means including a second pair of resilient legs extending divergently outwardly from a bight section, one of said legs being integrally attached to the free end of one of the legs of said first pair of legs.

2. A fastening device according to claim 1, wherein one of said legs of said second pair is foreshortened relative to the other leg of said pair and includes a resilient tongue extending outwardly therefrom for snap-fastening coacting engagement with a flanged portion of one of said members.

3. A fastening device according to claim 2, wherein said foreshortened leg is bent inwardly adjacent its free end to provide a cam-like flange to facilitate snap-fastening coacting engagement of said tongue.

4. A fastening device according to claim 2, wherein said tongue is of a lesser lengthwise dimension as compared to that of said foreshortened leg.

5. A fastening device for connecting a pair of members in assembled relationship, said device comprising a pair of spaced, resilient legs extending from a bight portion connecting said legs together and adapted for receiving therebetween a portion of one of said members, one of said legs including a retainer means for engageable coaction with one of said members, and attachment means extending from the free end of one of said legs for attachment of the device to the other of said members, said attachment means including an arm extending generally normal from the free end of one of said legs, said arm having a resilient flange adjacent its free end extending outwardly and upwardly toward said bight portion for engagement with a confronting surface of one of said members.

6. A fastening device for connecting a pair of members in assembled relationship, said device comprising a pair of spaced, resilient legs extending from a bight portion connecting said legs together and adapted for receiving therebetween a portion of one of said members, one of said legs including a retainer means for engageable coaction with one of said members, and attachment means extending from the free end of one of said legs for attachment of the device to the other of said members, and including a resilient arm struck from the material of said bight portion and extending outwardly from the general plane of said bight portion, said arm including a tongue struck from the material of one of said legs and adapted for engagement within a notched portion provided in one of said members.

7. A fastening device according to claim 1, wherein said attachment means includes a resilient flange extending upwardly and angularly inwardly from the free end of one of said legs adapted for engagement within a slot provided in one of said members.

8. A fastening device according to claim 1, wherein said retainer means includes a resilient tab struck from the material of one of said legs and extending upwardly and angularly inwardly in the general direction toward said bight portion and adapted for engagement within an aperture provided in one of said members.

9. A fastening device according to claim 1, wherein said retainer means includes a resilient flange bent from the free end of one of said legs and extending downwardly and angularly outwardly in the general direction away from said bight portion and adapted for bearing engagement against a confronting surface of one of said members.

10. A fastening device according to claim 7, wherein said attachment means includes a second resilient flange extending upwardly and angularly inwardly from the free end of the other of said legs adapted for engagement with a confronting interior surface provided in said one member below the said slot therein.

11. A fastening device according to claim 10, wherein said flanges are both bent angularly upwardly in a general direction toward the general plane of said bight portion, and said arm extending angularly outwardly and upwardly from said bight portion on the side opposite said legs.

12. A fastening device according to claim 1, wherein the legs of said first mentioned pair extend convergently toward one another in a direction away from said bight portion.

13. A fastening device according to claim 12, wherein all of said legs are of substantially the same width in transverse cross section.

14. A fastening device according to claim 6, wherein said tongue is of a lesser transverse width as compared to that of said arm.

15. A fastening device according to claim 6, wherein said tongue extends generally vertically upwardly in a direction away from said arm.

References Cited
UNITED STATES PATENTS

| | | | |
|---|---|---|---|
| 2,309,189 | 1/1943 | Hancock et al. | 248—27 X |
| 2,369,480 | 2/1945 | Mills | 24—81 X |
| 2,751,106 | 6/1956 | Schrader | 24—81 X |
| 2,775,010 | 12/1956 | Beford. | |
| 3,088,560 | 5/1963 | Preuss | 24—81 X |
| 3,279,729 | 10/1966 | Buttriss | 248—27 |

ROY D. FRAZIER, *Primary Examiner.*

WILLIAM D. LOULAN, *Assistant Examiner.*